(12) United States Patent
Saitou

(10) Patent No.: US 7,950,705 B2
(45) Date of Patent: May 31, 2011

(54) UNDERRUN PROTECTOR MOUNTING STRUCTURE OF VEHICLE

(75) Inventor: Takashi Saitou, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 300 days.

(21) Appl. No.: 12/160,484

(22) PCT Filed: Nov. 8, 2006

(86) PCT No.: PCT/JP2006/322224
§ 371 (c)(1),
(2), (4) Date: Jul. 10, 2008

(87) PCT Pub. No.: WO2007/080694
PCT Pub. Date: Jul. 19, 2007

(65) Prior Publication Data
US 2010/0156122 A1    Jun. 24, 2010

(30) Foreign Application Priority Data
Jan. 13, 2006   (JP) .................................. 2006-005684

(51) Int. Cl.
*B60R 19/26*    (2006.01)
(52) U.S. Cl. ........................ 293/102; 293/135; 293/155
(58) Field of Classification Search .................. 293/102, 293/118, 132, 133, 135, 155
See application file for complete search history.

(56) References Cited

U.S. PATENT DOCUMENTS

| | | | | |
|---|---|---|---|---|
| 5,507,546 A | * | 4/1996 | Holley | 293/133 |
| 6,116,667 A | * | 9/2000 | Torcomian | 293/132 |
| 6,176,530 B1 | | 1/2001 | Gollungberg | |
| 6,652,010 B1 | * | 11/2003 | Huddle et al. | 293/102 |
| 2004/0119303 A1 | * | 6/2004 | Gollungberg et al. | 293/132 |
| 2006/0119116 A1 | * | 6/2006 | Goertz | 293/132 |

FOREIGN PATENT DOCUMENTS

| | | |
|---|---|---|
| EP | 1972505 A1 | 9/2008 |
| JP | 49-135937 | 11/1974 |
| JP | 2001-515432 A | 9/2001 |
| JP | 2001-315595 A | 11/2001 |
| JP | 2003-054336 A | 6/2003 |
| JP | 2003-276536 A | 10/2003 |
| JP | 2003-312404 A | 11/2003 |
| JP | 2004-175306 A | 6/2004 |
| JP | 2004-237877 A | 8/2004 |
| JP | 2004-237878 A | 8/2004 |
| JP | 2004-243984 A | 9/2004 |
| JP | 2005-088740 A | 4/2005 |
| JP | 2005-225326 A | 8/2005 |
| WO | 98/41423 A1 | 9/1998 |

* cited by examiner

*Primary Examiner* — Joseph D Pape

(57) ABSTRACT

An underrun protector mounting structure includes: a chassis frame; a front underrun protector which is disposed at the front or rear of the chassis frame and extended in a lateral direction of the vehicle; a bracket 6 for fixing the front underrun protector to the chassis frame; and a support part interposed between the front underrun protector and the bracket. The support part has a first plate part disposed on the front underrun protector side and a second plate part disposed on the first plate part on the bracket 6 side. The first plate part is formed to be wider in the lateral direction of the vehicle than the second plate part 32. The first and second plate parts are stacked to form a leaf spring shape in a longitudinal direction of the vehicle.

10 Claims, 7 Drawing Sheets

UNDERRUN PROTECTOR MOUNTING STRUCTURE OF VEHICLE

CROSS REFERENCE TO RELATED APPLICATION

This application is a National Stage of International Application No. PCT/JP2006/322224 filed on Nov. 8, 2006, claiming priority based on Japanese Patent Application No. 2006-005684, filed Jan. 13, 2006, the contents of all of which are incorporated herein by reference in their entirety.

TECHNICAL FIELD

The present invention relates to an underrun protector mounting structure disposed at the front or rear of a vehicle body frame.

BACKGROUND ART

When a vehicle with a low vehicle height (hereinafter referred to as a small vehicle) such as a passenger car collides head-on with or rear-ends a vehicle with a high vehicle height (hereinafter referred to as a large-sized vehicle) such as a truck, the small vehicle may go under the bottom of the large-sized vehicle. In order to prevent such an inconvenience, it has been known that the large-sized vehicle has an underrun protector provided at its front or rear. Examples of an underrun protector mounting structure of the vehicle including the underrun protector described above include those disclosed in Patent Documents 1 to 3.

According to the underrun protector mounting structure of a vehicle disclosed in Patent Document 1 described above, since a protector main body has a closed cross-section structure, high rigidity and strength can be secured. Moreover, a connection portion of the protector main body and a mounting base (the portion on which the largest bending moment acts) is reinforced by a stiffener disposed inside of the protector main body. Thus, rigidity and strength required for the protector main body against the bending moment can be secured.

According to the underrun protector mounting structure of a vehicle disclosed in Patent Document 2 described above, an impact load caused by collision can be effectively absorbed by rigidity and flexibility of a thin-walled steel pipe that forms a protector and of a reinforcing pipe to be inserted into the thin-walled steel pipe.

According to the underrun protector mounting structure of a vehicle disclosed in Patent Document 3 described above, an underrun protector is connected to a supporting arm fixed to a vehicle body frame through a connection member. This connection member has a main body part, connected to the supporting arm, with an approximately squared U-shaped cross-section, and flange parts which are extended, while facing each other, in a lateral direction of the vehicle from ends of the main body part and which are connected to the underrun protector. Thus, a thickness of the underrun protector is substantially increased by connection of the flange parts of the connection member. Therefore, rigidity and strength of the underrun protector are improved.

Patent Document 1: Japanese Patent Application Publication No. 2003-276536
Patent Document 2: Japanese Patent Application Publication No. 2003-312404
Patent Document 3: Japanese Patent Application Publication No. 2004-175306

DISCLOSURE OF INVENTION

Problems to be Solved by the Invention

Here, the underrun protector is generally connected to a vehicle body frame through a supporting member such as a bracket. Thus, particularly, when an impact load acts, from any one of the front and rear of the vehicle, on either of the two ends of the underrun protector in the lateral direction of the vehicle, a bending moment focused on a connection spot between the protector and the supporting member as well as impact force toward the rear or front of the vehicle acts on the spot. Thus, excessive stress is intensively placed on the spot, thereby making the underrun protector likely to be deformed such as being dented or bent. Such an inconvenience can be avoided by disposing the reinforcing member inside of the protector main body as in the underrun protector mounting structure of a vehicle disclosed in Patent Document 1, or by disposing the reinforcing pipe inside of the thin-walled steel pipe of the protector as in the underrun protector mounting structure of a vehicle disclosed in Patent Document 2. However, in the underrun protector mounting structures of a vehicle disclosed in Patent Documents 1 and 2, the reinforcing member disposed inside of the underrun protector increases a weight of the underrun protector. Moreover, the number of parts is increased and the structure as well as mounting procedures get complicated.

Moreover, in the underrun protector mounting structure of a vehicle disclosed in Patent Document 3, improvement in the rigidity and strength of the protector depends on thicknesses of the flange parts provided in the connection member having an approximately hat-shaped cross-section. Thus, when an impact load acts, from the front of the vehicle, on either of the two ends of the protector in the lateral direction of the vehicle, the impact load causes stresses to be intensively placed on a boundary between the main body part of the connection member and each of the flange parts on the lateral side of the vehicle. As a result, the underrun protector may be bent around the boundary. Such an inconvenience can be avoided by increasing the thickness of the connection member. However, an increase in the thickness of the connection member leads to an increase in weight. Moreover, due to a complicated shape of the connection member having the main body part and the flange parts, the cost required for manufacturing the connection member is increased.

Therefore, it is an object of the present invention to provide an underrun protector mounting structure of a vehicle, which improves rigidity and strength of the underrun protector without increasing the weight thereof.

Means for Solving the Problems

In order to achieve the foregoing object, an underrun protector mounting structure of a vehicle according to the present invention includes: a vehicle body frame; an underrun protector which is disposed at any one of the front and rear of the vehicle body frame and extended in a lateral direction of the vehicle; a bracket for fixing the underrun protector to the vehicle body frame; and a support part interposed between the underrun protector and the bracket. The support part has a plurality of plate-like members. The plurality of plate-like members are formed to be gradually narrower in the lateral direction of the vehicle from one plate-like member closer to the underrun protector toward a plate-like member closer to the bracket, and are stacked to form a leaf spring shape in a longitudinal direction of the vehicle.

In the above configuration, since the support part is disposed on the underrun protector on the bracket side, a substantial thickness of a portion of the underrun protector, the portion being in contact with the support part, is increased by the support part. Moreover, since the support part has the plurality of plate-like members stacked in a leaf spring shape, a substantial thickness of the underrun protector is increased in a stepwise manner toward the bracket. Thus, for example, in the case where two plate-like members (the one on the underrun protector side and the other on the bracket side, which is narrower in the lateral direction of the vehicle than that on the underrun protector side) are interposed between the underrun protector and the bracket, when an impact load caused by collision acts on either of the two ends of the underrun protector in the lateral direction of the vehicle, stresses mainly act on three points including a boundary between the underrun protector and either of the two ends of the plate-like member on the underrun protector side in the lateral direction of the vehicle, a boundary between the plate-like member on the underrun protector side and either of the two ends of the plate-like member on the bracket side in the lateral direction of the vehicle, and a boundary between the plate-like member on the bracket side and either of the two ends of the bracket in the lateral direction of the vehicle. Specifically, depending on the number of the plate-like members to be stacked, the stresses generated by the impact load caused by collision are suitably dispersed to the three boundaries above and relaxed. Thus, the stresses can be placed almost equally at each of the three points. Therefore, with a simple structure in which the plurality of plate-like members are interposed between the underrun protector and the bracket, local bending of the underrun protector can be effectively suppressed. Moreover, rigidity and strength of the underrun protector as a whole can be improved.

Moreover, the support part is separate from the underrun protector. Thus, without causing an increase in weight due to an increase in the thickness of the underrun protector, or the like, only shapes of the plurality of plate-like members of the support part, in other words, thicknesses and overall lengths thereof in the lateral direction of the vehicle can be set to dimensions that can withstand the impact load. Therefore, the underrun protector can be formed in a minimum thickness or the like, which satisfies the rigidity and strength thereof. Thus, a structure that minimizes an increase in weight can be achieved.

Moreover, one plate-like member may have upper and lower plate parts extended while facing each other, and the underrun protector may be disposed between the upper and lower plate parts.

In the above configuration, on top and bottom of the underrun protector, the upper and lower plate parts of the one plate-like member are disposed respectively. Therefore, vertical movement of the underrun protector is restricted by the one plate-like member. Thus, falling-off or the like of the underrun protector in collision can be effectively prevented.

In the case where the upper and lower plate parts of the one plate-like member are disposed in contact with the upper and lower parts of the underrun protector respectively, a substantial vertical thickness of the underrun protector is increased. Thus, the rigidity and strength of the underrun protector can be further improved.

Moreover, the upper plate part may have a front end edge extended in the lateral direction of the vehicle on top of the underrun protector, and the lower plate part may have a front end edge extended in the lateral direction of the vehicle below the underrun protector. Moreover, at least one of the two front end edges may have inclined portions inclined toward the bracket at its ends in the lateral direction of the vehicle.

In the above configuration, on at least one of the front end edges of the upper and lower plate parts, the inclined portions are formed, which are inclined outward in the lateral direction of the vehicle toward the bracket. Therefore, the support part can be reduced in weight by properly setting dimensions of the inclined portions. Moreover, the rigidity and strength of the underrun protector against the impact load can be adjusted according to an increase or decrease in areas of contact between the underrun protector and the upper and lower plate parts.

Moreover, the end of the plate-like member in the lateral direction of the vehicle, which is exposed in a stacked state, may have a tapered end face inclined outward in the lateral direction of the vehicle toward the underrun protector.

In the above configuration, by properly setting dimensions of the tapered end faces of the ends of each plate-like member in the lateral direction of the vehicle, a range of adjustment for the rigidity and strength of the underrun protector can be further expanded and the support part can be further reduced in weight.

Moreover, the plurality of plate-like members may include another plate-like member having an extended part extended toward the underrun protector, and the extended part of the another plate-like member may support from below at least one of the one plate-like member and the underrun protector in a state where the one plate-like member is attached to the underrun protector.

In the above configuration, the one plate-like member is separate from the another plate-like member having the extended part. Thus, the one plate-like member and the another plate-like member can be previously attached to the underrun protector and the bracket, respectively. Specifically, the one plate-like member and the another plate-like member can be joined in a state where the underrun protector having the one plate-like member attached thereto is placed on the extended part of the another plate-like member attached to the bracket. Therefore, the underrun protector can be easily positioned relative to the bracket and efficient mounting thereof can be performed.

Effects of the Invention

The underrun protector mounting structure of a vehicle according to the present invention surely improves rigidity and strength of the underrun protector without increasing the weight thereof.

Figure 1:
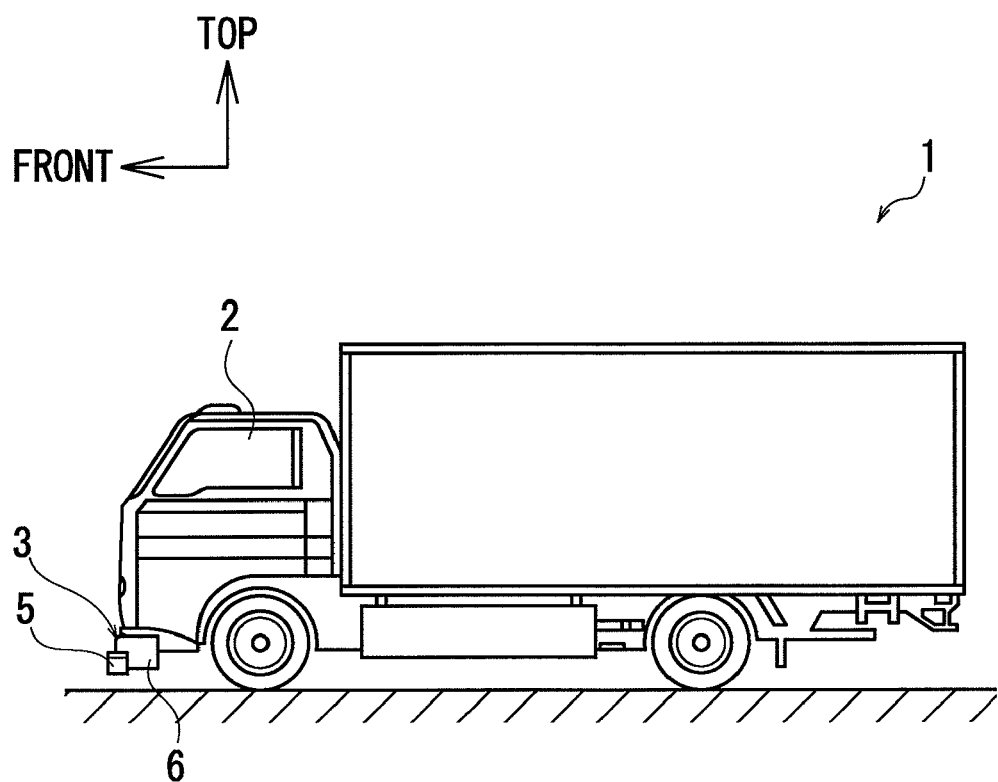
FIG. 1 is a schematic side view of a cab-over type truck including an underrun protector mounting structure according to the present invention.

EXPLANATION OF REFERENCE NUMERALS 1 vehicle
3 underrun protector mounting structure
4 chassis frame (vehicle body frame)
5 front underrun protector (underrun protector)
6 bracket
7 support part
24 end face
25 end face
31 first plate part (one plate-like member)
32 second plate part (another plate-like member)
34 upper plate part
35 lower plate part
36 end
37 protrusion
37a upper protrusion
37b lower protrusion
44 extended part
45 end
46 rib
46a upper rib
46b lower rib
62 front end edge
63 front end edge
64 inclined portion
65 inclined portion

BEST MODE FOR CARRYING OUT THE INVENTION

Figure 2:
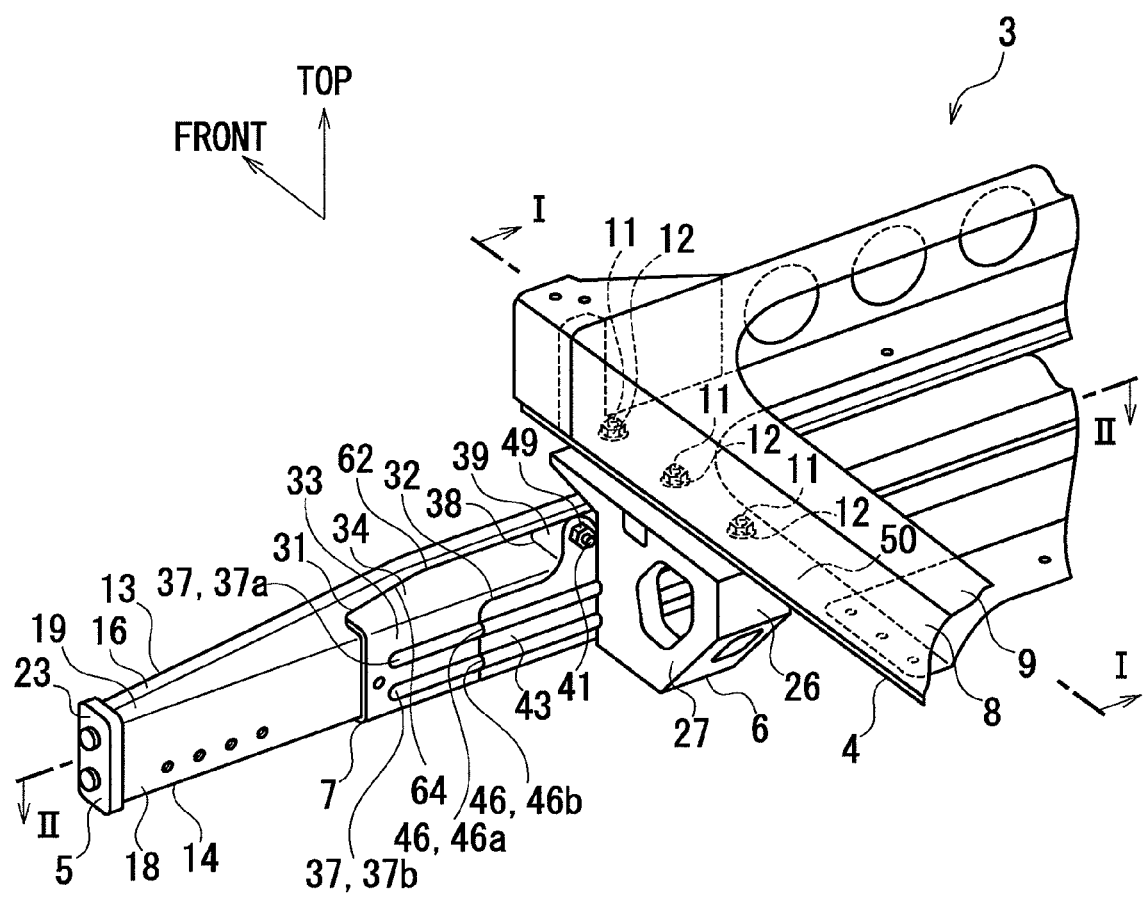
FIG. 2 is an enlarged perspective view of a main part of the underrun protector mounting structure.
Figure 3:
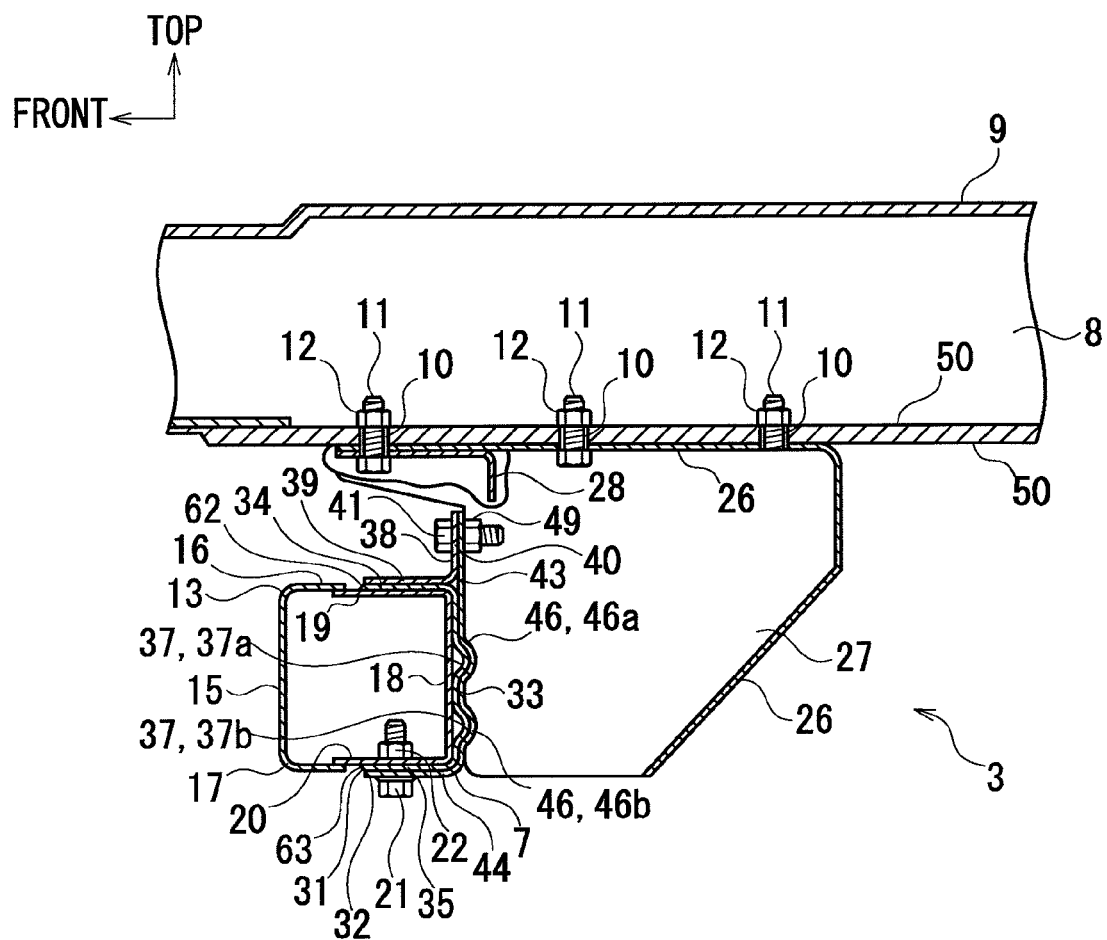
FIG. 3 is a cross-sectional view along the line I-I in FIG. 2.
Figure 4:
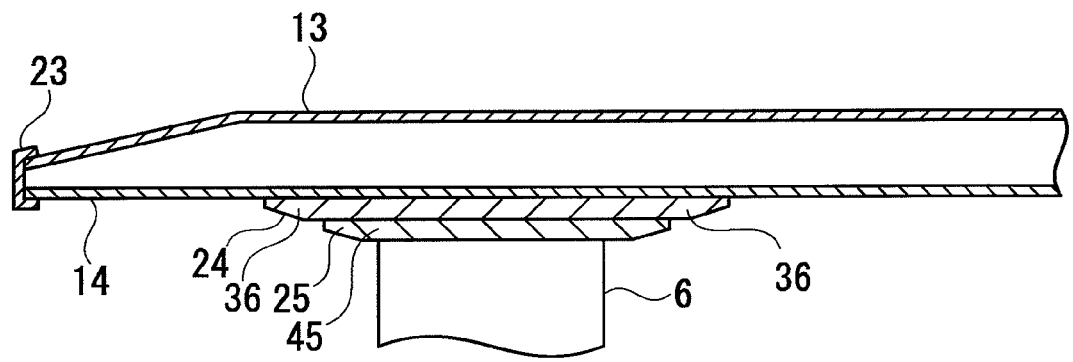
FIG. 4 is a cross-sectional view along the line II-II in FIG. 2.
Figure 5:
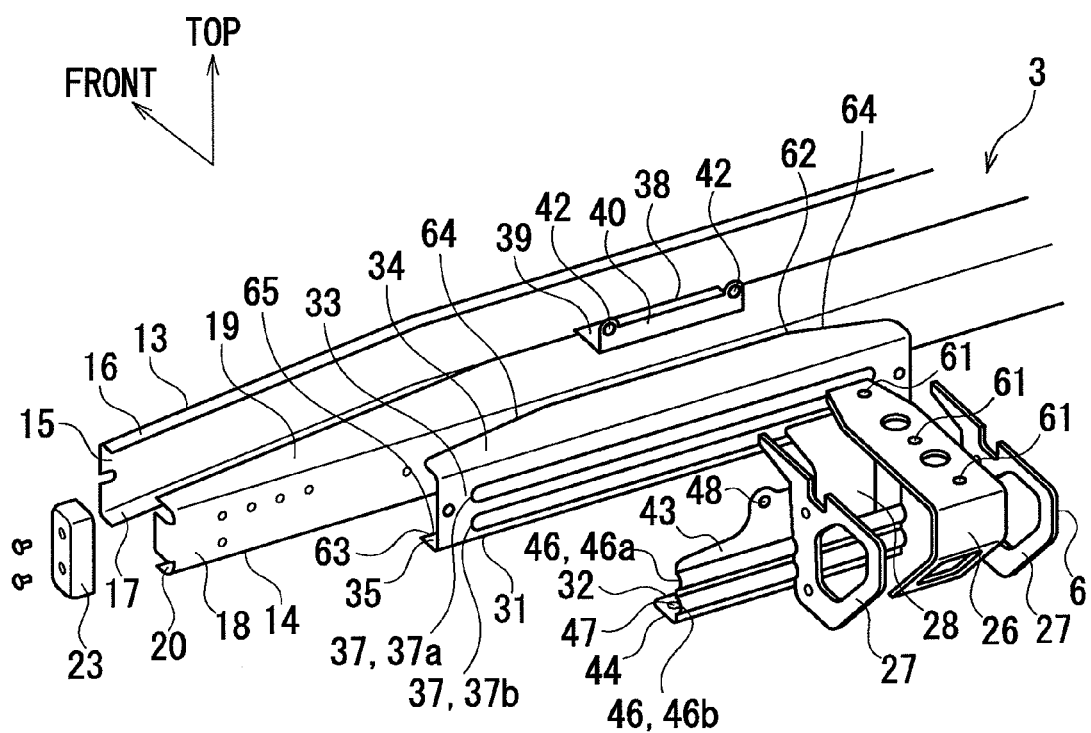
FIG. 5 is an exploded perspective view of the underrun protector mounting structure.
Figure 6:
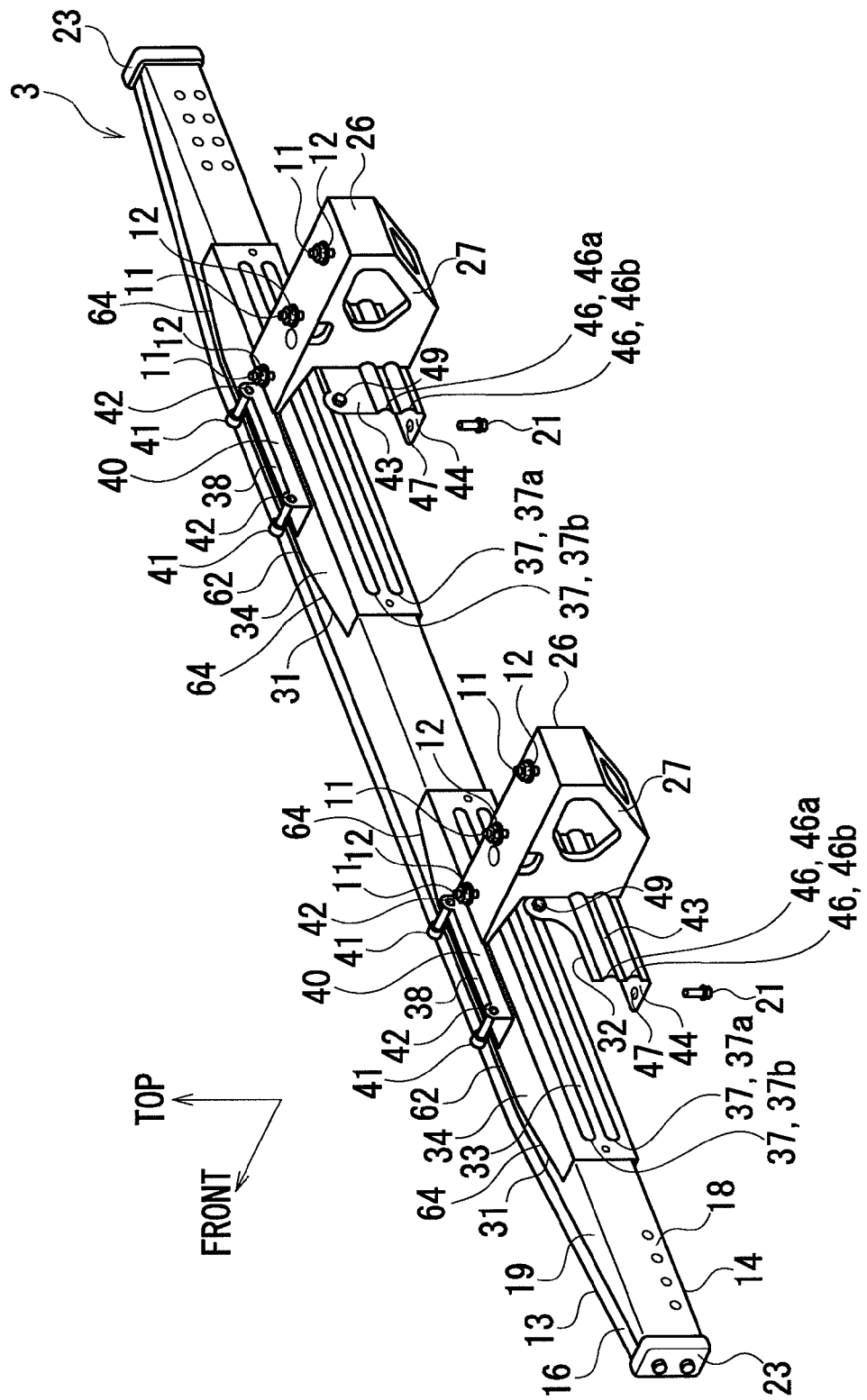
FIG. 6 is an enlarged perspective view of a main part, showing a mounting state of a front underrun protector in the cab-over type truck having a relatively high vehicle height.
Figure 7:
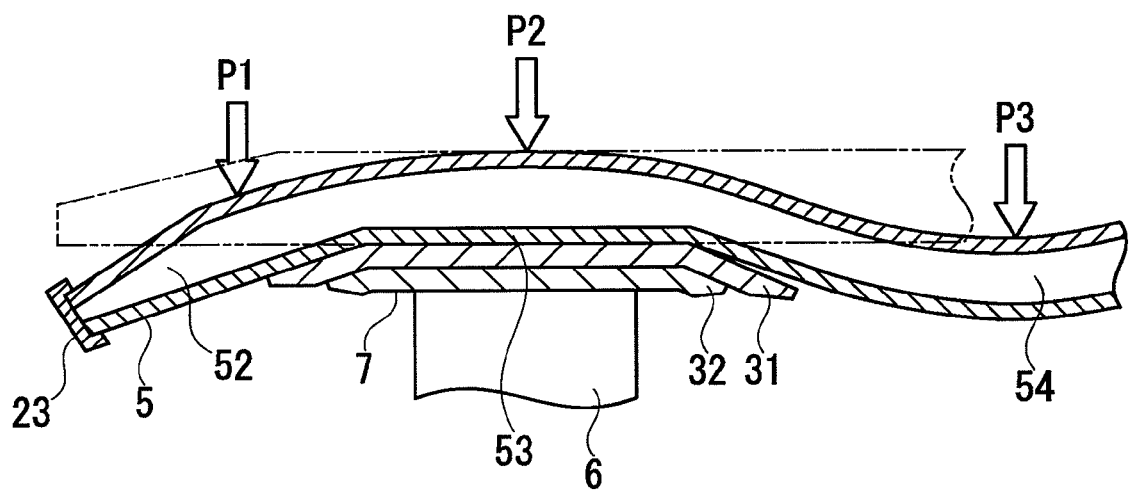
FIG. 7 is an enlarged cross-sectional view of a main part, showing a state where impact loads act on a front underrun protector.
Figure 8:
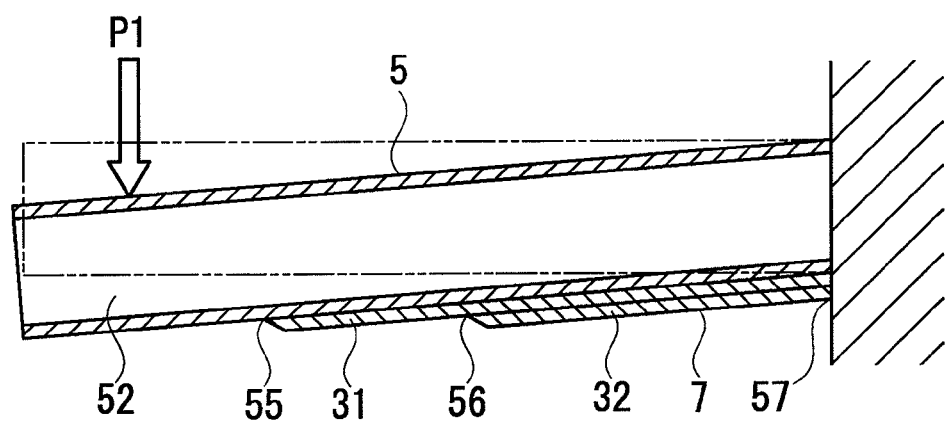
FIG. 8 is a schematic view of the front underrun protector modeled as a cantilever beam.
Figure 9:
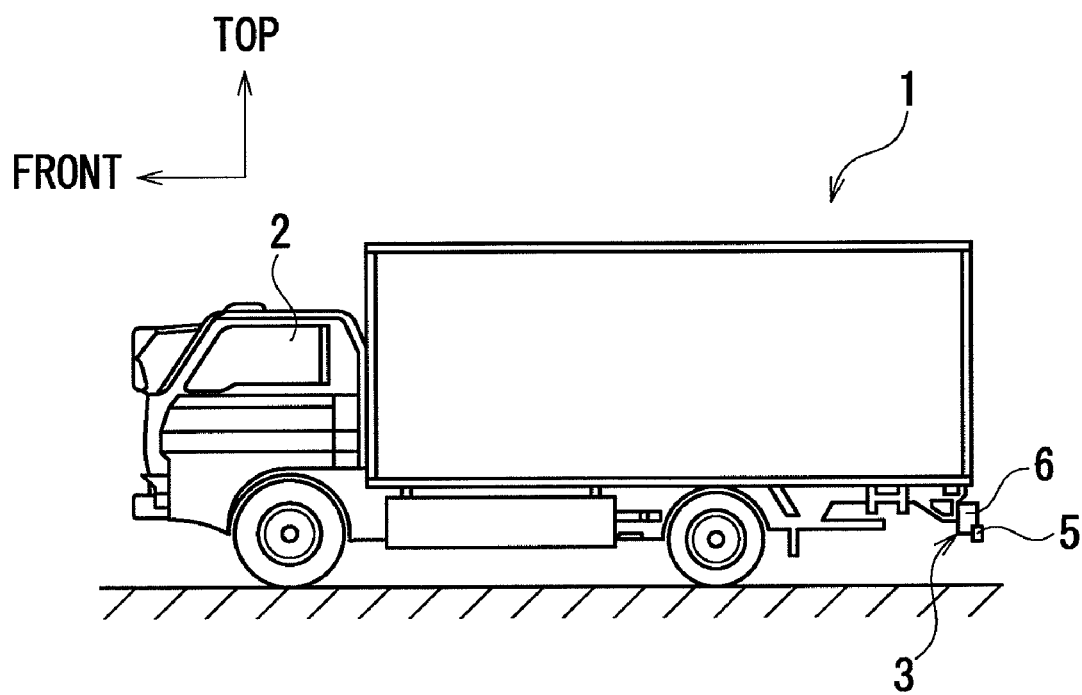
FIG. 9 is a schematic side view of a cab-over type truck when the underrun protector mounting structure according to the present invention is applied to a rear underrun protector.

With reference to the drawings, an embodiment of the present invention will be described below. FIG. 1 is a schematic side view of a cab-over type truck according to this embodiment. FIG. 2 is an enlarged perspective view of a main part of an underrun protector mounting structure. FIG. 3 is a cross-sectional view along the line I-I in FIG. 2. FIG. 4 is a cross-sectional view along the line II-II in FIG. 2. FIG. 5 is an exploded perspective view of the underrun protector mounting structure. FIG. 6 is an exploded perspective view of the underrun protector mounting structure. FIG. 7 is an enlarged cross-sectional view of a main part, showing a state where impact loads act on a front underrun protector. FIG. 8 is a schematic view of the front underrun protector modeled as a cantilever beam. Note that "front" in the drawings represents the front of the vehicle, "top" in the drawings represents the top of the vehicle, and P1 to P3 in FIGS. 7 and P1 in FIG. 8 represent impact loads caused by collision. Moreover, a left-right direction in the following description means a left-right direction in a state of facing the direction of movement of the vehicle.

As shown in FIG. 1, a vehicle 1 according to this embodiment is a cab-over type vehicle with a cab 2 generally positioned more anteriorly than an engine (not shown), and is equipped with an underrun protector mounting structure 3 at its front.

As shown in FIG. 2, the underrun protector mounting structure 3 includes: a chassis frame (vehicle body frame) 4 which is extended in a longitudinal direction on both sides in a lateral direction of the vehicle; a front underrun protector (underrun protector) 5 which is disposed at the front of the chassis frame 4 and extended in the lateral direction of the vehicle; a bracket 6 for fixing the front underrun protector 5 to the chassis frame 4; and a support part 7 interposed between the front underrun protector 5 and the bracket 6.

As shown in FIGS. 2 and 3, the chassis frame 4 has an approximately squared U-shaped cross-section and includes a side wall part 8, an upper wall part 9 and a bottom wall part 50. Specifically, the upper wall part 9 and the bottom wall part 50 are extended, while facing each other, inward in the lateral direction of the vehicle respectively from both ends, in a vertical direction, of the side wall part 8. At predetermined positions on the bottom wall part 50, a plurality of bolt insertion holes 10 for mounting the bracket are formed, into which bolts 11 can be inserted. Above the bolt insertion holes 10 for mounting the bracket, nuts 12 which can be fitted to the bolts 11 are provided.

As shown in FIGS. 2 to 6, the front underrun protector 5 has a protector piece 13 on the front side of the vehicle and a protector piece 14 on the rear side of the vehicle. Both of the protector pieces 13 and 14 are made of thin steel plates and formed to have an approximately squared U-shaped cross-section. The protector piece 13 has a side wall part 15, an upper wall part 16 and a bottom wall part 17. Specifically, the upper wall part 16 and the bottom wall part 17 are extended, while facing each other, toward the rear of the vehicle from both ends of the side wall part 15. The protector piece 14 has a side wall part 18, an upper wall part 19 and a bottom wall part 20. Specifically, the upper wall part 19 and the bottom wall part 20 are extended, while facing each other, toward the front of the vehicle from both ends of the side wall part 18. Moreover, at predetermined positions on the bottom wall part 20 of the protector piece 14, bolt insertion holes (not shown) for mounting the support part are formed, into which bolts 21 can be inserted. Above the bolt insertion holes for mounting the support part, nuts 22 which can be fitted to the bolts 21 are fixed by welding or the like.

The protector pieces 13 and 14 are connected to each other by welding or the like. Thus, a closed cross-section is formed between the protector pieces 13 and 14. Moreover, caps 23 are attached to both ends of the front underrun protector 5.

The bracket 6 is formed into an approximate box shape and has a peripheral wall part 26 having an approximately V-shaped cross-section, approximately plate-like side wall parts 27 and 27 disposed at lateral sides of the peripheral wall part 26, and a front wall part 28 having an approximately L-shaped cross-section and disposed at a front side of the side wall parts 27 and 27. The peripheral wall part 26 and the side wall parts 27, as well as the side wall parts 27 and the front wall part 28, are connected by welding or the like in a state where peripheral edges thereof come into contact with each other respectively.

Moreover, on upper surfaces of the peripheral wall part 26 and the front wall part 28, a plurality of bolt insertion holes 61 for mounting the chassis frame are formed, into which the bolts 11 can be inserted.

The bracket 6 is fastened and fixed to the chassis frame 4 in the following manner. Specifically, in a state where the upper surface of the peripheral wall part 26 of the bracket 6 comes into contact with a lower surface of the bottom wall part 50 of the chassis frame 4, the bolts 11 are inserted from below into the bolt insertion holes 10 for mounting the bracket in the chassis frame 4 and the bolt insertion holes 61 for mounting the chassis frame in the bracket 6, respectively. Thereafter, the bolts 11 are fitted to the nuts 12 attached to the chassis frame 4 and fastened.

The support part 7 has a first plate part (one plate-like member) 31 with an approximately squared U-shaped cross-section, which is disposed on the front underrun protector 5 side and a second plate part (another plate-like member) 32 with an approximately L-shaped cross-section, which is disposed on the first plate part 31 on the bracket 6 side. The first plate part 31 is formed to be wider in the lateral direction of the vehicle than the second plate part 32. The first and second plate parts 31 and 32 are stacked in a leaf spring shape in the longitudinal direction of the vehicle. Moreover, a width of the second plate part 32 in the lateral direction of the vehicle is set larger than that of the bracket 6 in the lateral direction of the vehicle on the front underrun protector 5.

The first plate part 31 has a side wall part 33, an upper plate part 34 and a lower plate part 35. Specifically, the upper plate part 34 and the lower plate part 35 are extended, while facing each other, toward the front of the vehicle from both ends of the side wall part 33.

Both ends 36 and 36 of the side wall part 33 in the lateral direction of the vehicle have tapered end faces 24, respectively, which are inclined outward in the lateral direction of the vehicle toward the front underrun protector 5.

The upper plate part 34 has a front end edge 62 extended, on top of the front underrun protector 5, in the lateral direction of the vehicle. The front end edge 62 has a tapered end face inclined toward the front underrun protector 5 and the front of the vehicle. Moreover, at both ends of the front end edge 62 in the lateral direction of the vehicle, inclined portions 64 are formed, which are inclined outward in the lateral direction of the vehicle toward the bracket 6. Note that the inclined portions 64 do not always have to be formed at the both ends but may be formed at only one of the ends.

The lower plate part 35 has a front end edge 63 extended in the lateral direction of the vehicle below the front underrun protector 5. The front end edge 63 has a tapered end face inclined toward the front underrun protector 5 and the front of the vehicle. Moreover, at both ends of the front end edge 63 in the lateral direction of the vehicle, inclined portions 65 inclined outward in the lateral direction of the vehicle toward the bracket 6 are formed approximately parallel to the inclined portions 64 of the front end edge 62. Note that the inclined portions 65 do not always have to be formed at the both ends but may be formed at only one of the ends. Moreover, it is also possible not to form the inclined portions 64 and 65 in the upper and lower plate parts 34 and 35, respectively, and to omit any one of the inclined portions 64 and 65.

A shape of an inner surface of the first plate part 31 is approximately the same as that of an outer surface of the protector piece 14 of the front underrun protector 5. In a state where the first plate part 31 and the front underrun protector 5 are attached to each other, the side wall part 33, the upper plate part 34 and the lower plate part 35 of the first plate part 31 come into contact with the side wall part 18, the upper wall part 19 and the bottom wall part 20 of the protector piece 14, respectively.

On the side wall part 33 of the first plate part 31, a plurality of protrusions 37, each having an approximately convex cross-section, are formed, which are projected toward the second plate part 32 and extended along the lateral direction of the vehicle. The plurality of protrusions 37 include an upper protrusion 37a and a lower protrusion 37b. The upper and lower protrusions 37a and 37b are formed to have approximately the same shape and provided approximately parallel to each other in the vertical direction of the vehicle with a space therebetween. Moreover, in a state where the first and second plate parts 31 and 32 are stacked, convex outer surfaces of the upper and lower protrusions 37a and 37b are fitted to concave inner surfaces of upper and lower ribs 46a and 46b, to be described later, of the second plate part 32, respectively.

At predetermined positions on the lower plate part 35 of the first plate part 31, bolt insertion holes (not shown) for mounting the front underrun protector are formed, into which the bolts 21 can be inserted. Moreover, a supporting piece 38 is connected, by welding or the like, to the upper plate part 34 of the first plate part 31. This supporting piece 38 is formed to have an approximately L-shaped cross-section and has a bottom wall part 39 and a side wall part 40. Specifically, the bottom wall part 39 comes into contact with the upper plate part 34 of the first plate part 31, and the side wall part 40 is extended so as to be bent upward from an end of the bottom wall part 39 on the bracket 6 side. At predetermined positions on the side wall part 40, bolt insertion holes 42 for mounting the second plate part are formed, into which bolts 41 can be inserted.

The second plate part 32 has a side wall part 43 and an extended part 44 which is extended so as to be bent toward the front underrun protector 5 from a lower end of the side wall part 43. Moreover, an end 45 of the second plate part 32 in the lateral direction of the vehicle has a tapered end face 25 inclined outward in the lateral direction of the vehicle toward the front underrun protector 5.

On the side wall part 43 of the second plate part 32, a plurality of ribs 46, each having an approximately concave cross-section, are formed, which are projected toward the bracket 6 and extended along the lateral direction of the vehicle. The plurality of ribs 46 include the upper rib 46a and the lower rib 46b. These upper and lower ribs 46a and 46b are formed to have approximately the same shape and provided approximately parallel to each other in the vertical direction of the vehicle with a space therebetween.

At predetermined positions on the extended part 44 of the second plate part 32, bolt insertion holes 47 for mounting the front underrun protector are formed, into which the bolts 21 can be inserted. Moreover, in an upper part of the side wall part 43 of the second plate part 32, bolt insertion holes 48 for mounting the supporting piece are formed, into which the bolts 41 can be inserted.

Next, with reference to FIGS. 7 and 8, description will be given of a deformed state of the front underrun protector when impact loads are applied thereto.

As shown in FIG. 7, when impact loads P1 to P3 act, toward the rear of the vehicle, on the front underrun protector 5 at front sides of ends 52 thereof in the lateral direction of the vehicle, at a front side of a supporting part 53 thereof supported by the bracket 6 and at a front side of a center part 54 between the left and right brackets 6 and 6, the ends 52 in the lateral direction of the vehicle and the center part 54 are moved toward the rear of the vehicle with bending deformations of the front underrun protector 5 and the support part 7.

Here, the front underrun protector 5 is supported by the brackets 6 and 6 (see FIG. 2) which are disposed at the left and right sides. Thus, the front underrun protector 5 including the center part 54 between the brackets 6 and 6 can be structurally simulated as a both-end support beam. Meanwhile, each of the both ends 52 of the front underrun protector 5 in the lateral direction of the vehicle is supported at one point on the supporting part 53. Thus, each of the both ends 52 of the front underrun protector 5 in the lateral direction of the vehicle can be structurally simulated as a cantilever beam (see FIG. 8). Specifically, when the impact load P3 is applied to the center part 54 of the front underrun protector 5, the center part being simulated as the both-end support beam, the impact load P3 acts, with its force divided into two, on both of the left and right supporting parts 53 and 53. Meanwhile, when the impact load P1 is applied to either of the two ends 52 of the front underrun protector 5 in the lateral direction of the vehicle, the end being simulated as the cantilever beam, the impact load P1 acts intensively on the supporting part 53. Accordingly, a bending moment acting on the front underrun protector 5 with the impact load P1 part as an origin increases in proportion to a distance from the supporting part 53. Therefore, in the case where the impact load P1 acts on the front side of either of the two ends 52 in the lateral direction of the vehicle, a high stress is placed at the end of the supporting part 53, compared with the case where the impact load P3 acts on the front side of the center part 54. A structure of this embodiment for relaxing such a high stress will be described with reference to FIG. 8 showing the case where one of the both ends 52 of the front underrun protector 5 in the lateral direction of the vehicle is modeled as the cantilever beam.

As shown in FIG. 8, in the case where the impact load P1 caused by collision acts on either of the two ends 52 of the front underrun protector 5 in the lateral direction of the vehicle, the stacked first and second plate parts 31 and 32 can gradually amplify a substantial thickness (section modulus) according to the increased bending moment described above. Thus, portions in which stresses are placed are dispersed mainly to three points, including a boundary 55 between the front underrun protector 5 and either of the two ends of the first plate part 31 in the lateral direction of the vehicle, a boundary 56 between the first plate part 31 and either of the two ends of the second plate part 32 in the lateral direction of the vehicle, and a boundary 57 between the second plate part 32 and either of the two ends of the bracket 6 in the lateral direction of the vehicle. Specifically, when the impact load caused by collision acts on the front underrun protector 5, no excessive stress is placed in a specific portion of the front underrun protector 5. Thus, the bending deformation of the front underrun protector 5 itself can be suppressed. Accordingly, the front underrun protector 5 can be suitably moved backward. Moreover, as in the case of the section modulus described above, the stacked first and second plate parts 31 and 32 can gradually amplify a substantial thickness (geometrical moment of inertia), too. Thus, a movement amount (deformation amount) of the front underrun protector 5 itself due to application of the impact load P1 can be suppressed.

As described above, according to this embodiment, since the support part 7 is disposed on the front underrun protector 5 on the bracket 6 side, a substantial thickness of a portion of the front underrun protector 5, the portion being in contact with the support part 7, is increased by the support part 7. Moreover, since the support part 7 has the first and second plate parts 31 and 32 stacked in a leaf spring shape, a substantial thickness of the front underrun protector 5 is increased in a stepwise manner toward the bracket 6. Thus, the first plate part 31 on the front underrun protector 5 side and the second plate part 32 on the bracket 6 side, which is narrower in the lateral direction of the vehicle than the first plate part, are interposed between the front underrun protector 5 and the bracket 6. In this case, when the impact load P1 caused by collision acts on either of the two ends 52 of the front underrun protector 5 in the lateral direction of the vehicle, stresses mainly act on the three points including the boundary 55 between the front underrun protector 5 and either of the two ends of the first plate part 31 in the lateral direction of the vehicle, the boundary 56 between the first plate part 31 and either of the two ends of the second plate part 32 in the lateral direction of the vehicle, and the boundary 57 between the second plate part 32 and either of the two ends of the bracket 6 in the lateral direction of the vehicle. Specifically, the stresses placed by the impact load caused by collision are suitably dispersed to the three boundaries above and relaxed. Thus, the stresses can be placed almost equally at each of the three points. Therefore, with a simple structure in which the first and second plate parts 31 and 32 are interposed between the front underrun protector 5 and the bracket 6, local bending of the front underrun protector 5 can be effectively suppressed. Moreover, rigidity and strength of the front underrun protector 5 as a whole can be improved.

Moreover, the support part 7 is separate from the front underrun protector 5. Thus, without causing an increase in weight due to the increase in the thickness of the front underrun protector 5, or the like, only shapes of the first and second plate parts 31 and 32 of the support part 7, in other words, thicknesses and overall lengths thereof in the lateral direction of the vehicle can be set to dimensions that can withstand the impact load. Therefore, the front underrun protector 5 can be formed in a minimum thickness or the like, which satisfies the rigidity and strength thereof. Thus, a structure that minimizes an increase in weight can be achieved.

On the top and bottom of the front underrun protector 5, the upper and lower plate parts 34 and 35 of the first plate part 31 are disposed respectively. Therefore, vertical movement of the front underrun protector 5 is restricted by the first plate part 31. Thus, falling-off or the like of the front underrun protector 5 in collision can be effectively prevented.

Moreover, the upper and lower plate parts 34 and 35 of the first plate part 31 have the tapered front end edges 62 and 63 respectively, and are disposed in contact with the upper wall part 19 and the bottom wall part 20 of the front underrun protector 5 respectively. Therefore, a substantial vertical thickness of the front underrun protector 5 is increased while being adjusted. Thus, the rigidity and strength of the front underrun protector 5 can be further improved while suppressing the bending deformation thereof.

At both ends of the front end edges 62 and 63 of the upper and lower plate parts 34 and 35, the inclined portions 64 and 65 are formed, respectively, which are inclined outward in the lateral direction of the vehicle toward the bracket 6. Therefore, the support part 7 can be reduced in weight by properly setting dimensions of the inclined portions 64 and 65. Accordingly, the rigidity and strength of the front underrun protector against the impact load can be adjusted according to an increase or decrease in areas of contact between the front underrun protector 5 and the upper and lower plate parts 34 and 35. Moreover, since the upper and lower plate parts 34 and 35 have the inclined portions 64 and 65 formed at their both ends, the first plate parts 31 disposed in the left and right parts of the front underrun protector 5 are not required to be manufactured separately for left-side use and for right-side use. Therefore, cost required for manufacturing the first plate parts 31 can be reduced by parts-sharing.

In the case where the tapered end faces 24 and 25 are provided at the ends 36 and 45 of the first and second plate parts 31 and 32 respectively, by properly setting dimensions of the tapered end faces 24 and 25, the rigidity and strength of the front underrun protector 5 can be adjusted and the support part 7 can be reduced in weight.

The first plate part 31 is separate from the second plate part 32 having the extended part 44. Thus, the first and second plate parts 31 and 32 can be previously attached to the front underrun protector 5 and the bracket 6, respectively. Specifically, the first and second plate parts 31 and 32 can be joined in a state where the front underrun protector 5 having the first plate part 31 attached thereto is placed on the extended part 44 of the second plate part 32 attached to the bracket 6. Therefore, the front underrun protector 5 can be easily positioned relative to the bracket 6 and efficient mounting thereof can be performed.

Note that, in this embodiment, the underrun protector mounting structure 3 is applied to the front underrun protector 5 disposed at the front of the vehicle 1. Meanwhile, the underrun protector mounting structure 3 can also be applied to a rear underrun protector disposed at the rear of the vehicle.

Moreover, although the two plate-like members, the first and second plate parts 31 and 32, are used to form the support part 7, three or more plate-like members may be used to form the support part.

Furthermore, the protrusions 37 and the ribs 46 are provided on the first plate part 31 and the second plate part 32, respectively, at two spots on each part. However, those described above may be provided at three or more spots. Moreover, widths and heights of the protrusions 37 and the ribs 46 can also be arbitrarily set. Thus, the rigidity and strength of the front underrun protector 5 can be adjusted and the support part 7 can be reduced in weight.

Moreover, although the support part 7 is formed to be separate from the front underrun protector 5, the support part 7 may be formed integrally with the front underrun protector 5.

The above description has been given of the embodiment to which the invention made by the present inventors is applied. However, the present invention is not limited to the description and the drawings which constitute a part of the disclosure of the present invention according to the embodiment. Specifically, it may be added that, needless to say, other embodiments, examples, operational technologies and the like, which are made by those skilled in the art based on the embodiment, are all included in the scope of the present invention.

INDUSTRIAL APPLICABILITY

The underrun protector mounting structure according to the present invention can be applied, without causing an increase in weight, to vehicles equipped with the underrun protector required to have rigidity and strength.

The invention claimed is:

1. An underrun protector mounting structure of a vehicle, comprising:
   a vehicle body frame;
   an underrun protector which is disposed at any one of the front and rear of the vehicle body frame and extended in a lateral direction of the vehicle;
   a bracket for fixing the underrun protector to the vehicle body frame; and
   a support part interposed between the underrun protector and the bracket,
   wherein the support part has a plurality of plate-like members, which are formed to be narrower in the lateral direction of the vehicle from one of the plurality of plate-like members disposed closest to the underrun protector toward another one of the plurality of plate-like members disposed closest to the bracket, and are stacked to form a leaf spring shape in a longitudinal direction of the vehicle, and
   wherein at least one of the plurality of plate-like members comprises plate-like parts.

2. An underrun protector mounting structure of a vehicle, comprising:
   a vehicle body frame;
   an underrun protector which is disposed at least at one of a front and a rear of the vehicle body frame and extends in a lateral direction of the vehicle;
   a bracket for fixing the underrun protector to the vehicle body frame; and
   a support part interposed between the underrun protector and the bracket, the support part comprising:
   a plurality of plate-like members, which are formed to be narrower in the lateral direction of the vehicle from one of the plurality of plate-like members disposed closest to the underrun protector toward another one of the plurality of plate-like members disposed closest to the bracket and are stacked to form a leaf spring shape in a longitudinal direction of the vehicle,
   wherein at least one of the plurality of plate-like members has upper and lower plate parts, which extend in the longitudinal direction of the vehicle facing each other, and
   the underrun protector is disposed between the upper and lower plate parts.

3. The underrun protector mounting structure of a vehicle, according to claim 2, wherein
   the upper plate part has a front end edge extended in the lateral direction of the vehicle on top of the underrun protector,
   the lower plate part has a front end edge extended in the lateral direction of the vehicle below the underrun protector, and
   at least one of the front end edges has an end portion extending away from the bracket in the lateral direction of the vehicle, the end portion being wider proximate to the bracket.

4. The underrun protector mounting structure of a vehicle, according to claim 1, wherein
   at least one of the plurality of plate-like members comprises a front end edge extending in the lateral direction of the vehicle, and comprising a tapered end face which is exposed in the stacked state of the plurality of plate-like members and tapers toward the underrun protector.

5. The underrun protector mounting structure of a vehicle, according to claim 1, wherein
   the plurality of plate-like members includes a first plate-like member and a second plate-like member having an extended part extended toward the underrun protector, and
   the extended part of the second plate-like member supports from below at least one of the first plate-like member and the underrun protector when the first plate-like member is attached to the underrun protector.

6. The underrun protector mounting structure of a vehicle, according to claim 2, wherein
   at least one of the plurality of plate-like members comprises a front end edge extending in the lateral direction of the vehicle, and comprising a tapered face, which is exposed in the stacked state of the plurality of plate-like members and tapers toward the underrun protector.

7. The underrun protector mounting structure of a vehicle, according to claim 3, wherein at least one of the front end edges comprises a tapered end face, which is exposed in the stacked state of the plate-like members and tapers toward the underrun protector.

8. The underrun protector mounting structure of a vehicle, according to claim 2, wherein
   the plurality of plate-like members includes a first plate-like member and a second plate-like member having an extended part extended toward the underrun protector, and the extended part of the second plate-like member supports from below at least one of the first plate-like member and the underrun protector when the first plate-like member is attached to the underrun protector.

9. The underrun protector mounting structure of a vehicle, according to claim 3, wherein the plurality of plate-like members includes a first plate-like member and a second plate-like member having an extended part extended toward the underrun protector, and the extended part of the second plate-like member supports from below at least one of the first plate-like member and the underrun protector when the first plate-like member is attached to the underrun protector.

10. The underrun protector mounting structure of a vehicle, according to claim 4, wherein the plurality of plate-like members includes a first plate-like member and a second plate-like member having an extended part extended toward the underrun protector, and the extended part of the second plate-like member supports from below at least one of the first plate-like member and the underrun protector when the first plate-like member is attached to the underrun protector.

* * * * *